(12) United States Patent
Eising et al.

(10) Patent No.: US 11,891,280 B2
(45) Date of Patent: Feb. 6, 2024

(54) ARRANGEMENT AND METHOD FOR ALIGNING A WHEEL BLOCK ON AN END CARRIAGE, IN PARTICULAR A CRANE END CARRIAGE

(71) Applicant: Konecranes Global Corporation, Hyvinkaa (FI)

(72) Inventors: Ralph Eising, Bochum (DE); Lukas Pieper, Bochum (DE); Thomas Düllmann, Hagen (DE); Gregor Jansen, Bottrop (DE); Tony Hong, Shanghai (CN); Henry Chen, Shanghai (CN)

(73) Assignee: Konecranes Global Corporation, Hyvinkää (FI)

( * ) Notice: Subject to any disclaimer, the term of this patent is extended or adjusted under 35 U.S.C. 154(b) by 0 days.

(21) Appl. No.: 18/245,481

(22) PCT Filed: Nov. 3, 2021

(86) PCT No.: PCT/EP2021/080439
§ 371 (c)(1),
(2) Date: Mar. 15, 2023

(87) PCT Pub. No.: WO2022/096477
PCT Pub. Date: May 12, 2022

(65) Prior Publication Data
US 2023/0257235 A1    Aug. 17, 2023

(30) Foreign Application Priority Data

Nov. 5, 2020  (DE) .................... 10 2020 129 194.9

(51) Int. Cl.
*B66C 9/08*  (2006.01)
*B66C 9/16*  (2006.01)
*B60B 33/00* (2006.01)

(52) U.S. Cl.
CPC ............ *B66C 9/08* (2013.01); *B60B 33/0018* (2013.01); *B60B 33/0021* (2013.01); *B66C 9/16* (2013.01)

(58) Field of Classification Search
CPC ......... B66C 9/08; B66C 9/16; B60B 33/0018; B60B 33/0021
See application file for complete search history.

(56) References Cited

U.S. PATENT DOCUMENTS

| 4,422,212 A | * | 12/1983 | Sheiman | ................ A45C 5/143 280/37 |
| 4,817,237 A | * | 4/1989 | Murphy | .............. B60B 33/0002 16/257 |
| 2005/0015928 A1 | * | 1/2005 | Arsenault | ........... B60B 33/0039 16/300 |

FOREIGN PATENT DOCUMENTS

| CA | 2827399 A1 * | 10/2012 | ............. B61B 13/00 |
| CN | 105415103 A |  3/2016 | |

(Continued)

OTHER PUBLICATIONS

Preliminary Report on Patentability of the International Searching Authority in English from corresponding Patent Cooperation Treaty (PCT) Application No. PCT/EP2021/080439, dated May 8, 2023.

*Primary Examiner* — Scott A Browne
(74) *Attorney, Agent, or Firm* — Gardner, Linn, Burkhart & Ondersma LLP

(57) ABSTRACT

An arrangement with an end carriage, a plate, and a wheel block which is detachably fastened to the end carriage and comprises a housing and a wheel that is mounted in the housing and projects out of the housing, wherein the plate is located between the end carriage and the wheel block and is fixedly connected to the end carriage and has a base surface directed towards the housing, and wherein the housing has a groove which receives the plate and which has a bottom (Continued)

surface, directed towards the base surface, and side walls delimiting the groove, wherein the wheel block is aligned relative to the end carriage by means of an interlocking connection between the wheel block and the plate.

11 Claims, 7 Drawing Sheets

(56) References Cited

FOREIGN PATENT DOCUMENTS

| | | |
|---|---|---|
| DE | 31 34 750 C2 | 11/1983 |
| DE | 19 540 217 C1 | 1/1997 |
| DE | 699 13 882 T2 | 11/2004 |
| DE | 10 2004 008 552 B3 | 7/2005 |
| DE | 102011002044 A1 | 10/2012 |
| DE | 102016102312 A1 | 8/2017 |

* cited by examiner

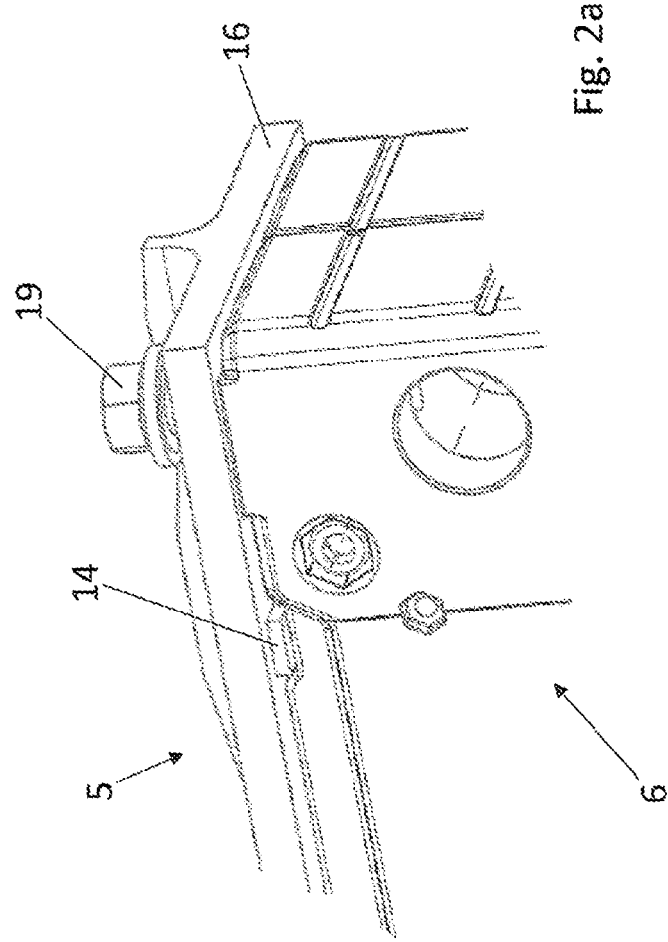

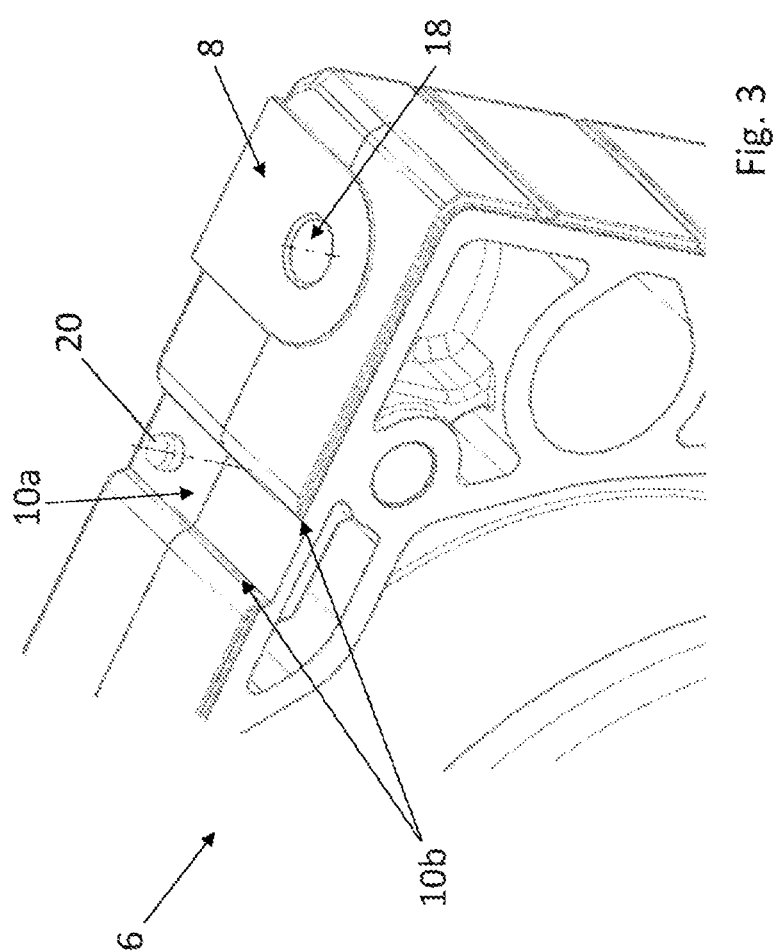

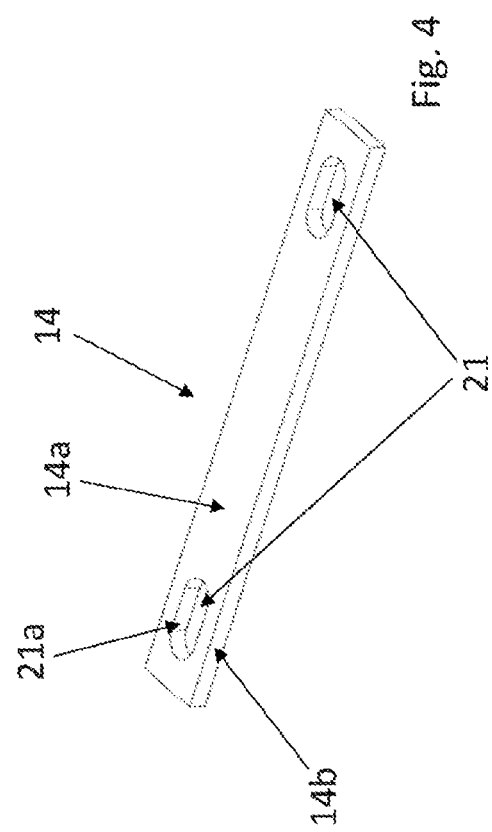

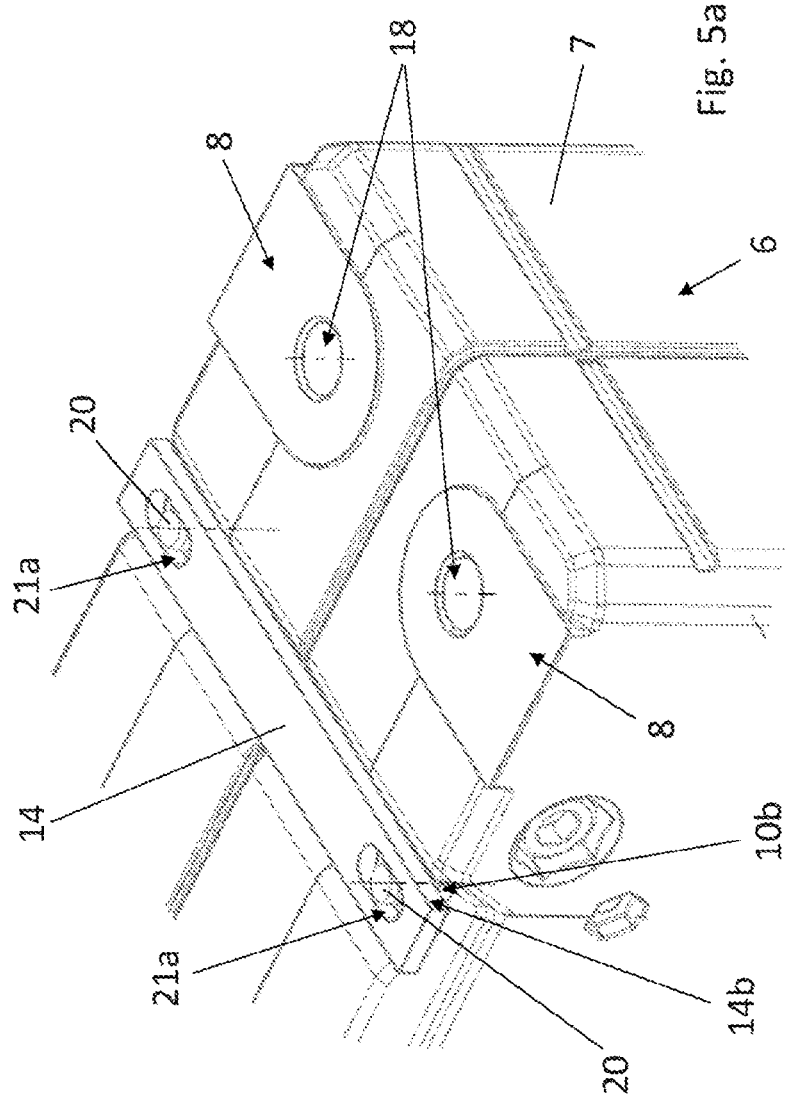

ARRANGEMENT AND METHOD FOR ALIGNING A WHEEL BLOCK ON AN END CARRIAGE, IN PARTICULAR A CRANE END CARRIAGE

FIELD OF THE INVENTION

The invention relates to an arrangement including an end carriage, a plate, and a wheel block detachably fastened to the end carriage, and a method for the initial mounting of a wheel block on an end carriage.

BACKGROUND OF THE INVENTION

As a result of wear or defects, a wheel block mounted on an end carriage—in particular, a crane end carriage—may be required. This mounting process involves aligning the wheel block on the end carriage in order to avoid a skew of the wheels on a wheel track—in particular, a crane wheel track. Otherwise, there is, for example, the risk that the wheels grind (abrade) from the skew of the wheel track and therefore wear more quickly. In addition, as the skew angle increases, lateral forces arise which stress the end carriage beyond a given operating stress.

Furthermore, when an overhead crane is used, for example, there is a risk that the running behavior of the overhead crane will be severely disturbed by the skew.

A generic arrangement and a generic method are known from DE 10 2011 002 044 A1. The wheel block disclosed therein has a groove which is mechanically machined precisely and has lateral inner guide surfaces, which are formed by opposite side walls of the groove which delimit the groove. The plate fixedly connected to the end carriage is also mechanically machined precisely and has side surfaces formed as lateral outer guide surfaces. The wheel block is aligned on the end carriage by means of an interlocking connection between the lateral outer guide surfaces of the plate and the lateral inner guide surfaces of the groove, which connection at the same time serves as a linear guide for adjusting the position of the trolley relative to the end carriage.

DE 699 13 882 T2 discloses an overhead crane whose main girder and head girder are flexibly connected to one another in order to be able to move relative to one another during movements of the overhead crane, wherein a bolt moves in a slot.

Proceeding from this prior art, the object of the present invention is to provide a way of reducing the effort to machine the wheel block and the plate required for replacing and aligning wheel blocks.

Advantageous embodiments of the invention are specified in the dependent claims and the following description.

SUMMARY OF THE INVENTION

According to the invention—in an arrangement with an end carriage, a plate, and a wheel block which is detachably fastened to the end carriage and comprises a housing and a wheel that is mounted in the housing and projects out of the housing, wherein the plate is located between the end carriage and the wheel block and is fixedly connected to the end carriage and has a base surface directed towards the housing, and wherein the housing has a groove, which receives the plate and which has a bottom surface, directed towards the base surface, and side walls delimiting the groove, wherein the wheel block is aligned relative to the end carriage by means of an interlocking connection, which serves in particular as a guide, between the wheel block and the plate—reduced production cost at the plate and the wheel block is achieved in that the interlocking connection acting in the direction of the side walls is formed within the base surface of the plate.

For the arrangement according to the invention—in particular, in contrast to the arrangement disclosed in DE 10 2011 002 044 A1—it is therefore unnecessary to machine the groove—in particular, its side walls to form guide surfaces—and therefore the wheel block housing, to a precise fit to size and at corresponding expense. This also applies to the side surfaces of the plate which delimit the base surface, since according to the invention, no interlocking connection has to be produced between these and the groove or the side walls thereof. Instead, the width of the groove is preferably greater than the width of the plate in such a way that no guidance, and in particular linear guidance, is provided or possible between the side walls of the groove and the side surfaces, facing them, of the plate. The plate also preferably has a smaller thickness than the depth of the groove, so that no constraints can arise here either.

Within the scope of the invention, precision machining to size is understood to mean machining to exact tolerances—preferably mechanical machining, and in particular with the aid of a machine. In contrast to imprecise machining, in which comparatively coarser contours are applied to a workpiece—in particular, by means of cutting or roughing (milling)—precision machining—in particular, by means of grinding or finishing (milling)—produces a dimension on the workpiece that is a precise fit.

In a structurally simple manner, the interlocking connection—in particular, for forming the guide—is produced using two pins arranged on the bottom surface of the groove and using two slots introduced into the base surface of the plate.

It is also conceivable in principle that the interlocking connection—in particular, for forming the guide—be produced by only one slot introduced into the base surface of the plate, and two pins arranged on the bottom surface of the groove, or also only one pin. Instead of the particular pin, a different projection can also be formed on the bottom surface of the groove and interact with the particular slot in an interlocking manner. This also applies in the following if, by way of example, pin(s) and slots are mentioned.

The pins on the bottom surface of the groove and the slots in the base surface of the plate therefore jointly form the interlocking connection between the wheel block and the plate for a relative alignment of the wheel block on the end carriage. For this purpose, only the two pins and the two slots are to be machined to fit exactly to size. This also accordingly applies if a different number of pins or other types of projections or slots, e.g., only one slot, are provided.

The base surface of the plate and the bottom surface of the groove in the wheel block are directed towards one another when the wheel block is in a mounted state on the end carriage. In this case, the bottom surface of the groove is preferably arranged on an opposite side of the wheel block with respect to the wheel protruding out of the housing. Outside the groove, the housing has at least one connection surface—also referred to as a head connection surface—which is directed towards the end carriage. The housing preferably comprises four, mutually-independent connection surfaces. In the region of the connection surface(s), the wheel block is in particular fastened to the end carriage. The housing is usually composed of several parts—preferably of two, identical housing halves—as a result of which a correspondingly symmetrical structure of the housing and accordingly also of the wheel block results.

The pins arranged on the bottom surface of the groove are fixedly connected, and in particular screwed, glued, and/or welded, to the wheel block—in particular, by means of a force-fit and/or bonded connection. Of course, the pin can also be part of the housing—for example, in that the pin is already taken into account while casting the housing. The length of the pins, when the connection surface is placed on the end carriage, is preferably shorter than the distance from the bottom surface to a bottom of the slots or, in the case of through-slots, to the end carriage.

By means of the pins and the slots, the wheel block and the end carriage are aligned relative to one another. The relative alignment of the wheel block with respect to the end carriage causes in particular the track of the wheel to be aligned relative to the end carriage and/or a wheel track on which the wheel is moved. In other words, by means of the pins and slots, the wheel in particular is aligned with regard to its direction of movement.

The end carriage can be designed, for example, as a T-beam, double-T beam, box beam, L-profile beam, or C-profile beam. Several plates and wheel blocks can be arranged on a single end carriage. In the case of two wheel blocks, these are arranged one behind the other in particular in a running direction of the wheels. Of course, it is conceivable that the wheel blocks also be arranged next to one another with respect to the running direction of the wheels. A combination of both is also possible. It goes without saying that, when there are several wheel blocks, the relative alignment of each individual wheel block relative to the end carriage, or the alignment of the track of the wheel thereof relative to the end carriage and/or the wheel track, can take place individually.

A wheel block that can be used as the basis in the arrangement according to the invention is known, for example, from DE 10 2004 008 552 B3, DE 19 540 217 C1, or DE 31 34 750 C2.

With the arrangement according to the invention, it is possible, as with the arrangement disclosed in DE 10 2011 002 044 A1, to maintain a careful relative alignment of the wheel block to the end carriage, which was carried out during the initial mounting of the wheel block on the end carriage, in order to facilitate re-mounting of the existing wheel block or, when the wheel block is replaced, a mounting of a new wheel block. The existing or new wheel block can therefore be fastened to the end carriage without the need for a new relative alignment, and still avoid skewing. It is understood that the new wheel block must have, for this purpose, the pins according to the invention at exactly the same position on the wheel block.

It is particularly advantageous that the plate is welded to the end carriage—in particular, by means of hole spot welding. As a result, the plate is fixed permanently and accurately in position on the end carriage. An accidental displacement of the plate, in which the plate is brought from the position set during the initial mounting, is therefore avoided.

The plate can therefore be welded to only one point or one position by means of hole spot welding or another suitable welding method. It is of course conceivable for the plate to be welded at several points or positions.

As an alternative to welding, the plate can also be connected by means of pins or screws to the end carriage in order to fix the prior alignment of the plate relative to the end carriage.

It is also particularly advantageous that each slot of the interlocking connection has opposite and linear guide surfaces on which the particular pin rests.

The linear guide surfaces run parallel to a longitudinal extension of the slot. The tolerances for a distance between the linear guide surfaces and the tolerances for the outer diameter of the pin are configured so that there is a clearance fit between them. The clearance fit is configured so that the pin rests against the linear guide surfaces. By moving the pins in the slots, a position of the wheel block relative to the end carriage can be changed in the manner of a linear guide.

The linear guide therefore allows a displacement of the wheel block relative to the end carriage in a direction which runs parallel to the longitudinal extension of the slot or to the linear guide surfaces (floating bearing), but does not allow a displacement in a direction which runs transversely or perpendicular to the longitudinal extension of the slot or to the linear guide surfaces (fixed bearing).

It is, advantageously, provided that the linear guide surfaces of the slot be aligned parallel to an axis of rotation of the wheel.

The position of the wheel block relative to the end carriage can therefore be changed or adjusted in parallel to the axis of rotation of the wheel by moving the pins along the linear guide surfaces of the slots. A displacement of the wheel block in a direction running transversely or perpendicular to the axis of rotation is, however, not possible due to the contact of the pin with the linear guide surfaces. In particular, this ensures that the alignment of the track is maintained when the wheel block is displaced.

A first wheel block associated with a first wheel track can therefore also be displaced relative to a second wheel block associated with a second wheel track. If the first and second wheel blocks are arranged in parallel, and their wheels point in the same running direction, a track width, in particular, is set, i.e., a direct distance between the first and second wheel blocks.

In a structurally simple manner, the wheel block is screwed to the end carriage in order to fix the set position relative to the end carriage.

In other words, the wheel block is fastened to the end carriage by means of a screw connection, which comprises at least one, and preferably several, screw(s). The wheel block can therefore be easily mounted and removed. For the particular screw connection, at least one fastening hole—preferably designed as a blind hole with a thread—is provided in the wheel block—in particular, in its housing, and especially in the area of the particular connection surface. At least one through-hole is preferably provided in the end carriage.

However, it is also conceivable that the at least one fastening hole be formed in the wheel block as a through-hole, and at least one hole with threads be provided in the end carriage instead of the at least one through-hole.

It is also possible for the at least one hole to be formed in the wheel block and end carriage as a through-hole, and for the particular screwing of the screw connection to include at least one nut by means of which the at least one screw inserted through the two through-holes is screwed in order to fasten the wheel block to the end carriage.

If a screw connection is loosened, i.e., not fixed, the wheel block can be displaced relative to the end carriage in order to change the position of the wheel block and/or to adjust the track width. For this purpose, the at least one through-hole in the end carriage is in particular designed as a slot. A larger diameter of the through-hole compared to the screw size is also possible. After the track width is set, the screw connection(s) can be (re)tightened.

According to the invention, a crane—in particular, an overhead traveling crane, and, in particular, an overhead crane or gantry crane—is also improved by the fact that it comprises an arrangement according to the invention. The end carriage can be arranged, for example, on a bridge of the traveling crane or a support of the gantry crane and/or a crane trolley of the traveling crane or gantry crane.

According to the invention—in a method for the initial mounting of a wheel block on an end carriage, wherein the wheel block comprises a housing and a wheel which is mounted in the housing and projects out of the housing, wherein a plate with a base surface directed towards the housing is arranged between the end carriage and the wheel block, and wherein the housing is arranged with respect to the plate in such a way that a groove of the housing with a bottom surface, directed towards the base surface, and the sidewalls delimiting the groove receives the plate, wherein the wheel block is then aligned relative to the end carriage and releasably secured thereto, while an interlocking connection is established between the wheel block and the plate, wherein, after relative alignment of the wheel block to the end carriage, the plate is firmly connected to the end carriage—reduced production cost at the plate and the wheel block is achieved in that the interlocking connection acting in the direction of the side walls is made within the base surface of the plate.

Of course, the advantages achieved above with respect to the arrangement also result from the method according to the invention.

It can, advantageously, be provided that the interlocking connection between the wheel block and the plate be produced by means of two pins arranged on the bottom surface of the groove and by means of two slots introduced into the base surface of the plate.

In other words, during the initial mounting, the wheel block is first aligned together with the plate on the end carriage, wherein the interlocking connection, acting in the direction of the side walls of the groove, between the wheel block and the plate is arranged within the base surface of the plate, for which purpose the pins of the wheel block are preferably arranged in the slots in the plate and rest against linear guide surfaces of the slot. To align the wheel block relative to the end carriage and therefore to align the track, the wheel block is pivoted about an imaginary vertical axis until the wheel can run straight ahead in its running direction on a wheel track. In this alignment, the wheel block is loosely screwed to the end carriage. After the alignment, the wheel block is fixedly screwed to the end carriage. Subsequently, the plate on the end carriage is unreleasably and immovably fixed to the end carriage to permanently remain there—for example, by means of hole spot welding or another suitable welding method. Alternatively, pinning or screwing are also possible in order to fix the plate on the end carriage.

In the context of the invention, initial mounting is understood to mean a mounting in which an arrangement according to the invention with the plate is produced for the first time. This can, for example, be in the new construction of a trolley or in the context of maintenance. When the wheel block is replaced, or the existing wheel block is remounted in the process, or a new wheel block is mounted, the plate does not need to be connected to the end carriage. Instead, the already set relative alignment can be immediately assumed, and the still required adjustment of the track width by laterally displacing the wheel block can easily be achieved.

Advantageously, the plate is welded to the end carriage—in particular, by means of hole spot welding.

It is, advantageously, provided that the wheel block be screwed to the end carriage.

Otherwise, the details and advantages described for the arrangement also apply to the method according to the invention.

BRIEF DESCRIPTION OF THE DRAWINGS

Further details of the invention emerge from the following description of exemplary embodiments with reference to the drawing, in which:

FIG. 2a shows a further schematic, perspectival, and partial view of the arrangement from FIG. 2, FIG. 3 shows a schematic, perspectival, and partial view of a housing-half of a wheel block, FIG. 4 shows a schematic, perspectival view of a plate, FIG. 5a shows a further schematic, perspectival, and partial view of the arrangement from FIG. 5.

DETAILED DESCRIPTION OF THE PREFERRED EMBODIMENTS

Figure 1:
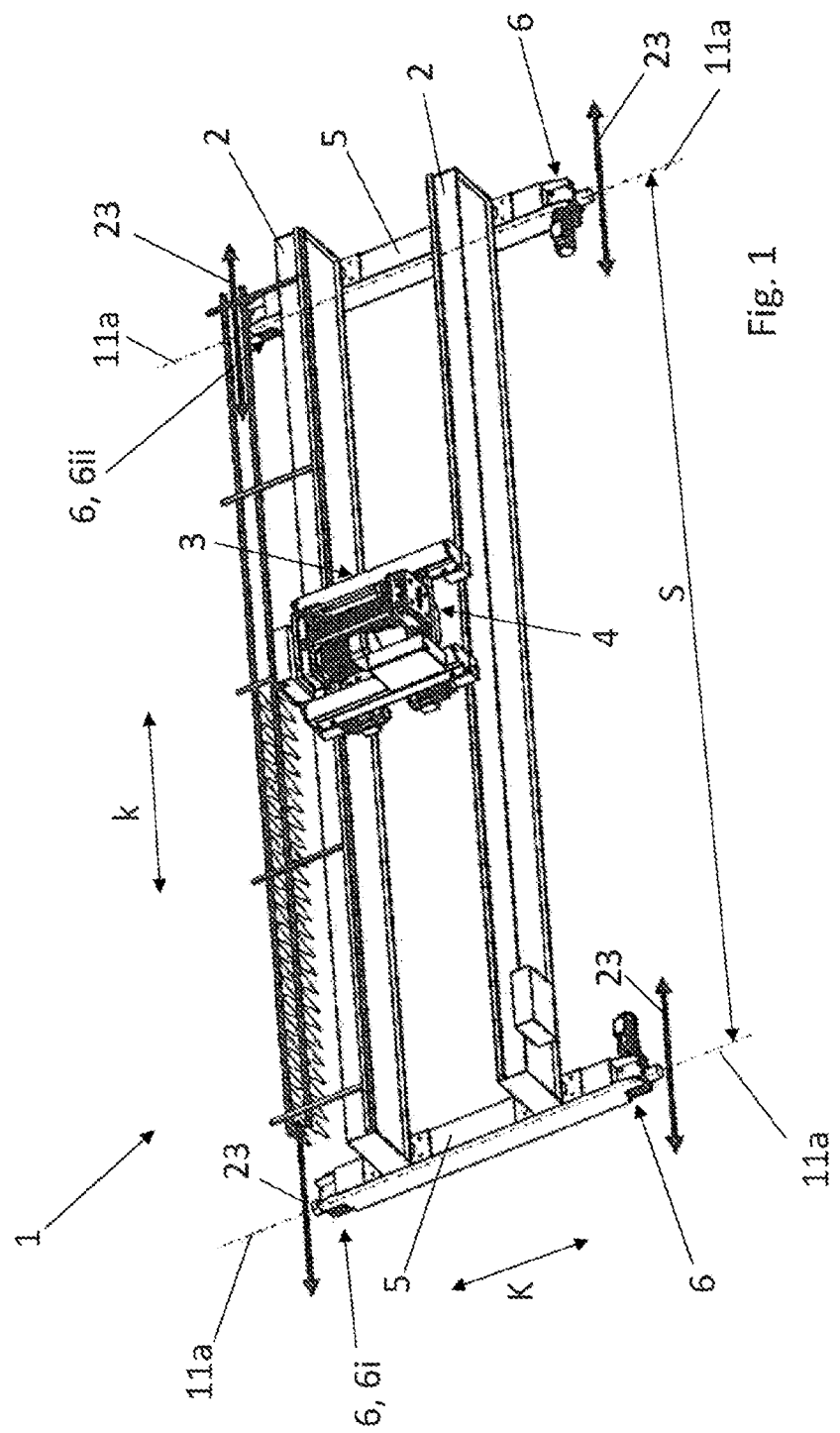
FIG. 1 shows a schematic, perspectival view of a traveling crane.

FIG. 1 shows a schematic, perspectival view of a running crane 1, which is designed here as a so-called two-girder overhead crane, for example. The running crane 1 can be moved essentially horizontally in a crane travel direction K on a rail path with two rails (not shown) that are parallel to each other, spaced apart from one another, and also termed a wheel track.

The running crane 1 comprises two box girders 2 which extend parallel to and at a distance from one another, and which, by way of example, form a horizontal crane girder and serve as a travel path for a trolley 3 with a hoist 4. In this context, the trolley 3 moves on the box girders 2 in a horizontal trolley direction k which is oriented at right angles to the crane travel direction K. Accordingly, the box girders 2 also extend in the trolley direction k. Alternatively, only a single box girder or double-T profile can also be provided in the manner of a single-girder overhead crane. The trolley 3 then moves, for example, on a lower flange of the box girder. In order to form the particular crane girder, truss girders can be used instead of box girders.

The box girders 2 lie on their particular opposite ends on end carriages running transversely thereto, and therefore in the crane driving direction K. A wheel block 6, which is optionally driven by an electric motor, is arranged at the opposite ends of the end carriages 5. The wheel blocks 6 are each movable with their wheel 11 (see FIG. 2) on the rails (not shown) in the crane driving direction K. Of course, the wheel blocks 6 can also be used on other crane types.

In the crane travel direction K of the running crane 1, the wheel paths of four wheels 11, and in particular their wheel path center lines 11a, extend through an imaginary contact line between a wheel center and a rail center. The wheel path center lines 11a are only schematically indicated by dashdotted lines. The position of the wheel block 6 relative to the end carriage 5 can be set in the adjustment directions 23. When the wheel block 6 is displaced in the adjustment directions 23, an alignment of the track is maintained.

The track width S is determined by a direct distance between the wheel paths running parallel in the crane travel direction K of the running crane 1—in particular, their wheel path center lines 11*a*—of two wheel blocks 6. A first wheel block 6*i* can be displaced relative to a second wheel block 6*ii* arranged parallel to the first wheel block 6*i*, in order to adjust the track width S. In this case, the first wheel block 6*i* is associated with a first wheel track, and the second wheel block 6*ii* is associated with a second wheel track parallel to the first wheel track, wherein the wheel 11 of the first wheel block 6*i* and the wheel 11 of the second wheel block 6*ii* point in the same running direction.

Figure 2:
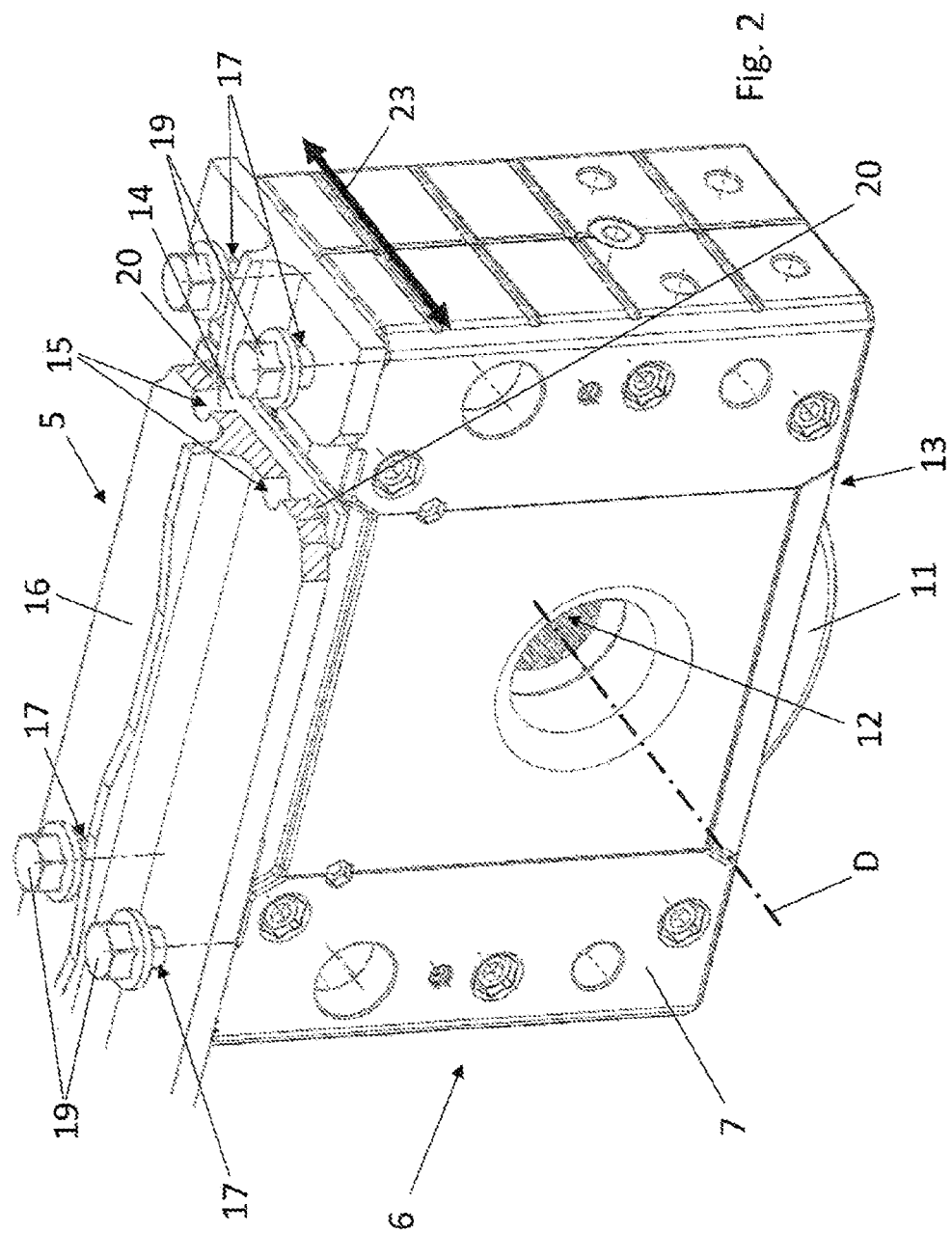
FIG. 2 shows a schematic, perspectival view of an arrangement with an end carriage, a plate, and a wheel block.

FIG. 2 shows a schematic, perspective view of an arrangement with an end carriage 5, a plate 14, and a wheel block 6. The end carriage 5 has a fastening plate 16, which is presented openly for better illustration of the arrangement according to the invention.

The wheel block 6 is arranged on the end carriage 5. The wheel block 6 has a box-shaped housing 7 which is open on its underside 13 and which is composed, for example, of two, identical housing halves. A wheel 11 is mounted in the housing 7 and rotates with a hub 12 about a horizontal axis of rotation D extending transversely to the crane travel direction K, and projects downwards, partially out of the housing 7, towards the underside 13. In the usual installation position, the axis of rotation D is oriented horizontally. The hub 12 is held laterally in each case in a sliding and/or roller bearing which is inserted into the housing 7.

By way of example, the fastening plate 16 has four through-holes 17 for releasably fastening the wheel block 6. The wheel block 6 comprises, by way of example, four fastening holes 18 (see FIG. 3), such that the wheel block 6 can be detachably fastened to the end carriage 5 when the through-holes 17 and the fastening holes 18 overlap. For this purpose, screws 19 are inserted through the through-holes 17 and screwed into the fastening holes 18, which are designed as threaded holes, for example.

The fastening plate 16 has at least one hole 15—in the present case, two holes 15—for performing a hole weld which serves to fasten the plate 14 via the hole weld to the fastening plate 16.

When the wheel block 6 is first mounted on the end carriage 5, the plate 14 is loosely inserted into a groove 10 of the housing 7 (see FIGS. 3 and 5), wherein the pins 20 of the wheel block 6 engage in the slots 21 of the plate 14. Then, the wheel block 6, and therefore also the track of the wheel 11, are aligned in the crane travel direction K so that the wheel 11 can roll along the rails of the running crane 1 with little wear. For this purpose, the wheel block 6 is pivoted about an imaginary vertical axis relative to the end carriage. After aligning the wheel block 6 and screwing tight the wheel block 6, the plate 14 is subsequently welded to the fastening plate 16 of the end carriage 5 in the holes and is therefore fixed non-detachably and immovably.

If it is then necessary to replace a wheel block 6 in the event of wear or a defect, the screws 19 are loosened, and the plate 14 remains in the welded position. Then, according to the invention, a new wheel block 6 of the same type is inserted by two matching pins 20 and screwed. Since the plate 14 is already aligned with respect to the crane travel direction K, and therefore to an ideal alignment of the wheel 11, the wheel block 6 does not have to be aligned relative to the end carriage 5 during a change, and remounting is simplified. The position of the wheel block 6 and therefore also the track width S can be easily adjusted as long as the wheel block 6 is not yet screwed tight to the end carriage 5. Each of the wheel blocks 6 is, namely, displaceable transversely to the crane travel direction K, wherein the alignment of the particular wheel 11 is maintained by means of the pins 20 and slots 21.

The axis of rotation D of the wheel 11 runs in particular parallel to linear guide surfaces 21*a* of the slot 21 (see FIG. 4). The position of the wheel block 6 relative to the end carriage 5 can therefore be changed or adjusted in parallel to the axis of rotation D of the wheel 11 by moving the pins 20 along the linear guide surfaces 21*a* of the slots 21. A displacement of the wheel block 6 in a direction running transversely or perpendicular to the axis of rotation D is, however, not possible due to the contact of the pin 20 on the linear guide surfaces 21*a*.

FIG. 2*a* shows a further schematic, perspective, and partial view of the arrangement from FIG. 2.

FIG. 3 shows a schematic, perspective, and partial view of a housing-half of a correspondingly symmetrical wheel block 6. The following statements regarding the housing 7 and the wheel block 6 accordingly refer to the second housing-half (not shown). The groove 10 is introduced at an upper side, opposite the underside 13, of the housing 7 (see FIGS. 2 and 5). The groove extends over the entire width of the shown housing-half, and therefore also of the housing 7. This extension direction runs in the trolley travel direction k, and therefore transversely to the crane travel direction K and transversely to the running direction of the wheel 11. In the crane travel direction K, the groove 10 is delimited at the front and rear in each case by a side wall 10*b*, which does not have to be machined precisely to size in the sense of the invention. The plate 14 (see also FIG. 4) can be inserted into the groove 10, wherein two pins 20 arranged on a base surface 10*a* of the groove 10 can be inserted into the two slots 21 (see also FIG. 5) in the base surface 14*a*. One of the pins 20 is arranged for each housing-half. According to the invention, the pins 20 are machined precisely to size.

In addition, four independent connection surfaces 8 are provided on the upper side of the housing 7 and are located in a region of the housing 7 outside the groove 10. Two connection surfaces 8 are provided for each housing-half. When the wheel block 6 is mounted on the end carriage 5, the connection surfaces 8 come to rest against the fastening plate 16.

A fastening hole 18 is arranged in each of the four connection surfaces 8, only one of which is shown in FIG. 3. Using the total of four fastening holes 18, the wheel block 6 is detachably fastened to the end carriage 5 by screwing the screws 19 into the fastening holes 18 after they have been pushed through the through-holes 17 of the fastening plate 16 (see FIG. 2).

FIG. 4 shows a schematic, perspective view of a plate 14, with two slots 21 formed in the base surface 14*a*. The plate 14 has circumferential side surfaces 14*b* which delimit the base surface 14*a* of the plate 14 and which do not have to be machined precisely to fit within the meaning of the invention. The slots 21 each have two guide surfaces 21*a* which, in contrast, are machined precisely to fit in order to form a linear guide for the wheel block 6 in each case with a pin 20.

Figure 5:
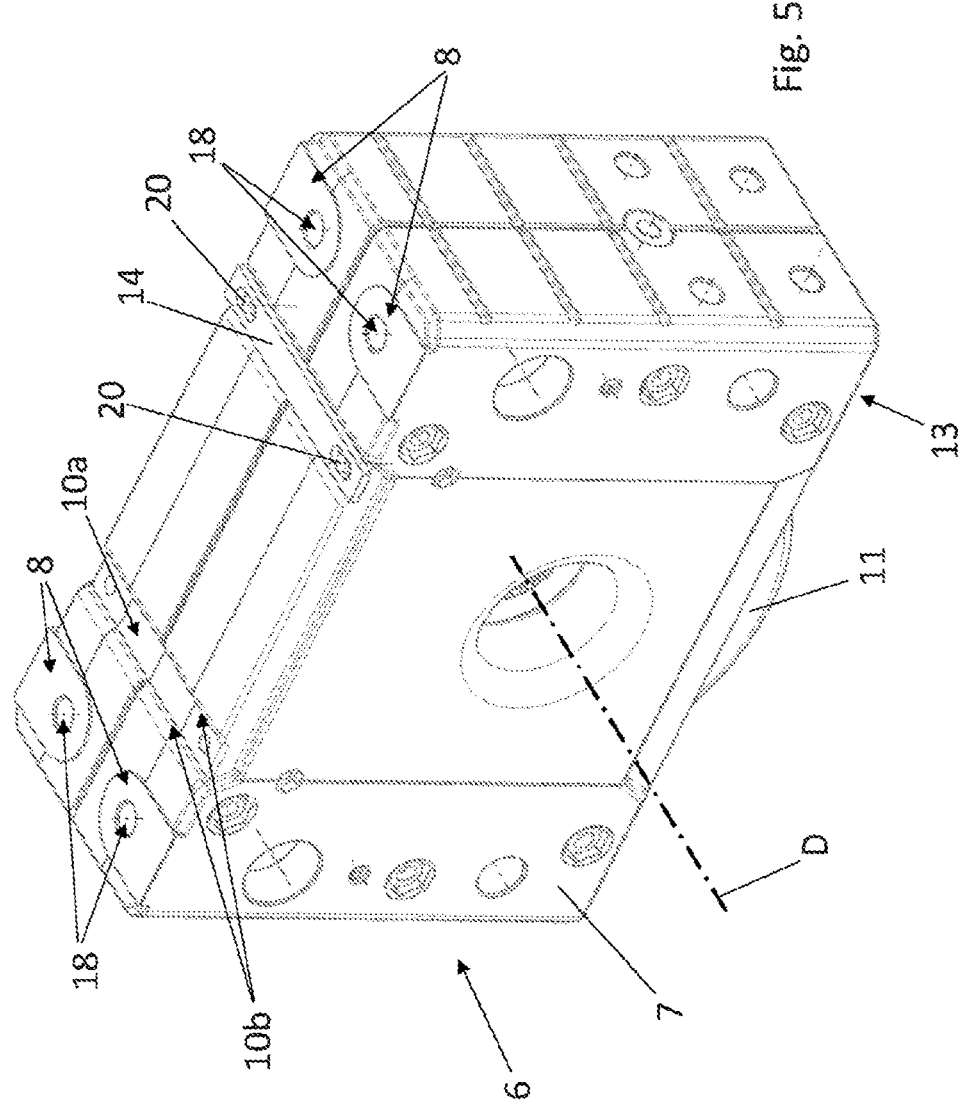
FIG. 5 shows a schematic, perspectival view of a wheel block with a plate placed in the groove.

FIG. 5 shows a schematic, perspective view of a wheel block 6, with a plate 14 placed in the groove 10.

FIG. 5*a* shows a further schematic, perspective, and partial view of FIG. 1*t* can be clearly seen that the width of the groove 10 and the width of the plate 14 are configured such that the side walls 10*b* of the groove 10 and the side surfaces 14b of the plate 14 are spaced apart from one another. In contrast, the pins 20 rest against the guide surfaces 21a of the slots 21. For this purpose, the pins 20 and the slots 21 are machined to precisely fit in such a way that the two guide surfaces of a slot and the associated pin are interlocking and fit precisely with respect to one another—in particular, in the direction of the side walls 10b.

The invention claimed is:

1. An arrangement with an end carriage, a plate, and a wheel block which is detachably fastened to the end carriage and comprises a housing and a wheel that is mounted in the housing and projects out of the housing, wherein the plate is located between the end carriage and the wheel block and is fixedly connected to the end carriage and has a base surface directed towards the housing, and wherein the housing has a groove, which receives the plate and which has a bottom surface, directed towards the base surface, and side walls delimiting the groove, wherein the wheel block is aligned relative to the end carriage by means of an interlocking connection between the wheel block and the plate, wherein the interlocking connection acting in the longitudinal direction of the side walls is formed within the base surface of the plate, and wherein the interlocking connection is produced by at least one slot introduced in the base surface of the plate and at least one projection or pin that is formed on the bottom surface of the groove to interact with the slot in an interlocking manner.

2. The arrangement according to claim 1, wherein the interlocking connection is produced by means of two pins arranged on the bottom surface of the groove and by means of two slots introduced into the base surface of the plate.

3. The arrangement according to claim 1, wherein the plate is welded to the end carriage.

4. The arrangement according to claim 2, wherein each slot has opposite and linear guide surfaces on which each of the pins rest.

5. The arrangement according to claim 4, wherein the linear guide surfaces of the slot are aligned parallel to an axis of rotation of the wheel.

6. The arrangement according to claim 1, wherein the wheel block is screwed to the end carriage.

7. A crane configured as an overhead crane or gantry crane having an arrangement according to claim 1.

8. A method for the initial mounting of a wheel block on an end carriage, wherein the wheel block comprises a housing and a wheel which is mounted in the housing and projects out of the housing, said method comprising:
   arranging a plate with a base surface directed towards the housing between the end carriage and the wheel block, wherein the housing includes a groove having a bottom surface and sidewalls delimiting the groove, and wherein said arranging the plate further comprises receiving the plate in the groove of the housing with the bottom surface of the groove directed towards the base surface of the plate;
   aligning the wheel block relative to the end carriage and releasably securing the wheel block to the end carriage, while an interlocking connection is established between the wheel block and the plate; and
   subsequently firmly connecting the plate to the end carriage after relative alignment of the wheel block to the end carriage, wherein the interlocking connection acting in the direction of the side walls is established within the base surface of the plate, wherein the interlocking connection is produced by at least one slot introduced in the base surface of the plate and at least one projection or pin that is formed on the bottom surface of the groove to interact with the slot in an interlocking manner.

9. The method according to claim 8, wherein the interlocking connection between the wheel block and the plate is produced by means of two pins arranged on the bottom surface of the groove and by means of two slots introduced into the base surface of the plate.

10. The method according to claim 8, wherein the plate is welded to the end carriage.

11. The method according to claim 8, wherein the wheel block is screwed to the end carriage.

* * * * *

UNITED STATES PATENT AND TRADEMARK OFFICE
CERTIFICATE OF CORRECTION

PATENT NO. : 11,891,280 B2
APPLICATION NO. : 18/245481
DATED : February 6, 2024
INVENTOR(S) : Ralph Eising et al.

It is certified that error appears in the above-identified patent and that said Letters Patent is hereby corrected as shown below:

In the Specification

Column 8
Line 26, "The groove extends" should be --The groove 10 extends--
Line 65, "FIG. 1t" should be --FIG. 5. It--

Signed and Sealed this
Nineteenth Day of March, 2024

Katherine Kelly Vidal
Director of the United States Patent and Trademark Office